(No Model.) 2 Sheets—Sheet 1.

J. FRENIER.
WHEEL.

No. 313,931. Patented Mar. 17, 1885.

Witnesses:
Frank J. Blanchard
E. H. Scott

Inventor:
Joseph Frenier
By Wm. Niles
Attorney.

(No Model.) 2 Sheets—Sheet 2.

J. FRENIER.
WHEEL.

No. 313,931. Patented Mar. 17, 1885.

Witnesses:
Frank S. Blanchard
E. H. Scott

Inventor:
Joseph Frenier
By Wm. Niles
Attorney.

UNITED STATES PATENT OFFICE.

JOSEPH FRENIER, OF LA PORTE, INDIANA.

WHEEL.

SPECIFICATION forming part of Letters Patent No. 313,931, dated March 17, 1885.

Application filed January 3, 1885. (No model.)

*To all whom it may concern:*

Be it known that I, JOSEPH FRENIER, of the city and county of La Porte, in the State of Indiana, have invented certain new and useful Improvements in Wheels, of which the following is a specification.

The object of my invention is to furnish a wheel for agricultural implements and other vehicles which may be constructed wholly of metal, and possess the qualities of cheapness, lightness, strength, and durability.

The drawings represent views of the wheel and its various parts.

Figure 1:
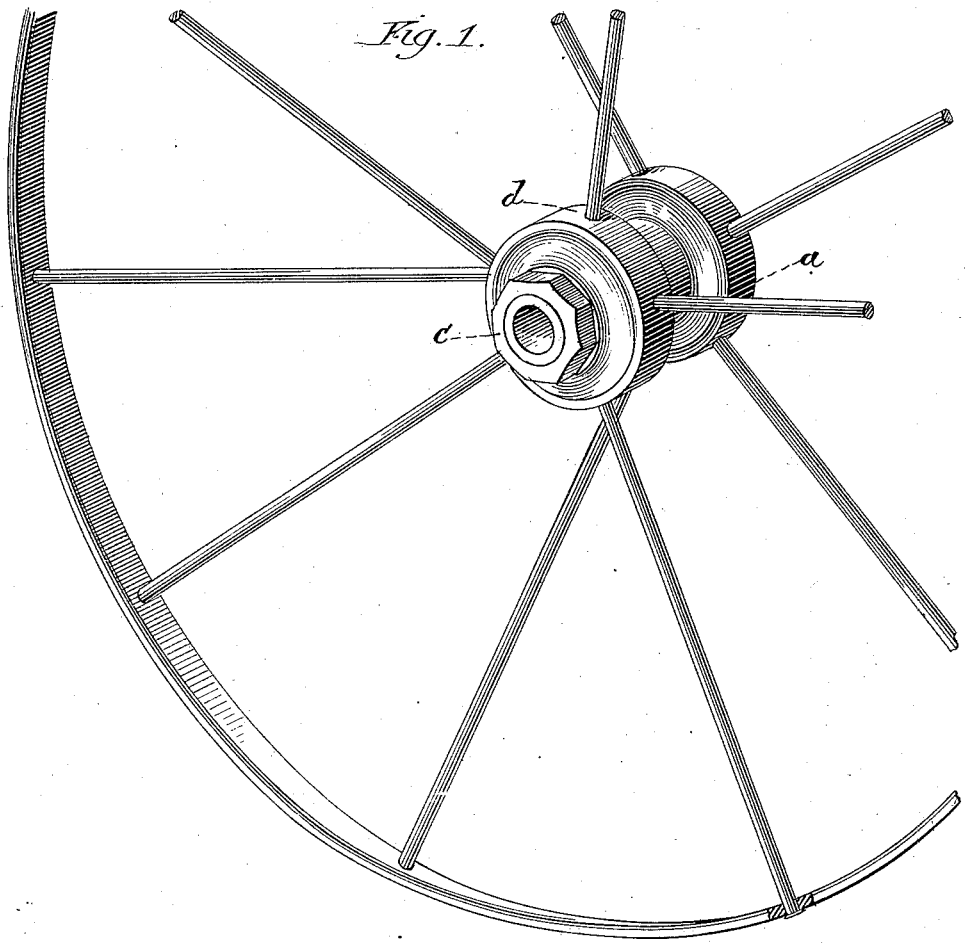
Figure 2:
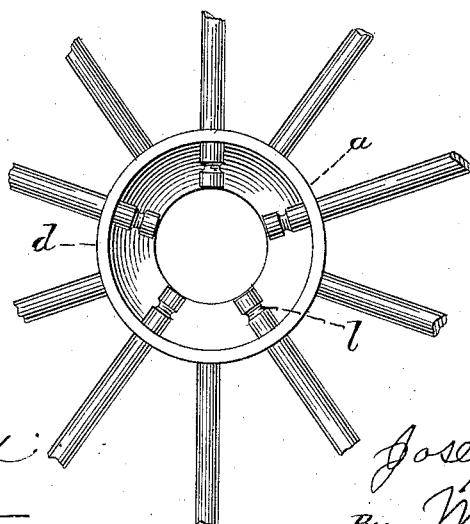
Figure 3:
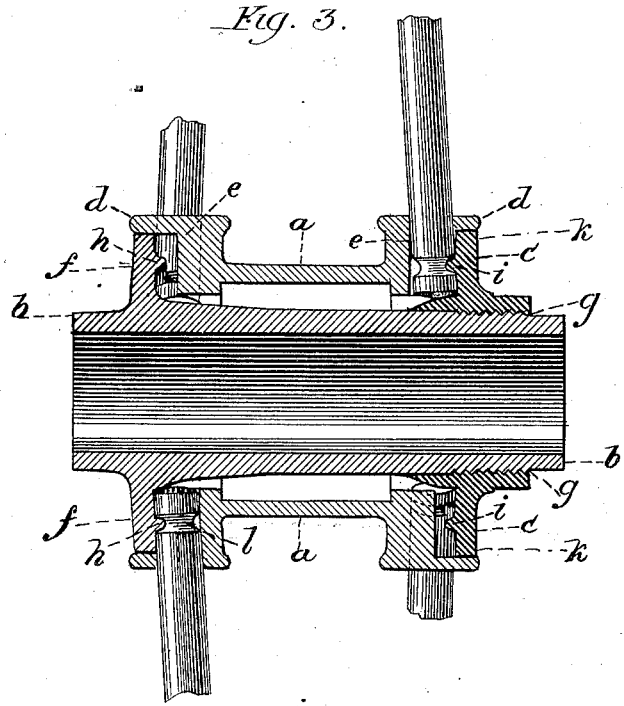
Figure 4:
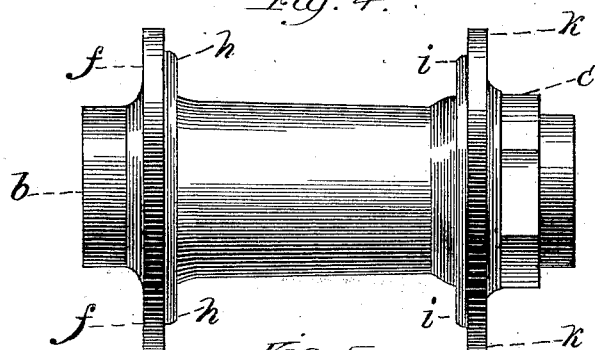
Figure 5:
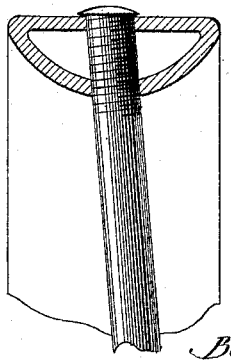

Figure 1 is a perspective view of the wheel. Fig. 2 is a cross-section of the hub. Fig. 3 is a longitudinal section of the hub. Fig. 4 is a side view of the box or renewable bearing for the spindle, and Fig. 5 is a cross-section of the rim or felly and tire combined.

The hub is constructed in three pieces, of cast, gray or malleable, iron. It consists of the spoke-holder $a$, the box $b$, and the nut $c$. The box fits snugly into the spoke-holder and is held in position by the nut, which is tightly screwed on. The central part of the spoke-holder has only sufficient diameter to inclose the box and give the requisite strength to the hub. The portions near the ends of the spoke-holder have a greater diameter than the middle portion, in order to hold the spokes securely and firmly. At each end of the spoke-holder an annular flange, $d\ d$, projects outward, forming a recess, into which the nut fits at one end and the flange on the box fits at the other end. The spoke-holes are made in the two flanges $d\ d$, one-half in each. These holes are dodged—that is, each hole is opposite the center of the space between two holes in the other end of the hub. The spaces between the spokes inside of the recesses $e\ e$ are partly filled with metal, so that the inner end of each spoke fits into a semicircular recess. The box has a flange, $f$, near one end, and a screw-thread, $g$, at the other end. There is an annular projection, $h$, on the inner surface of the flange $f$, and a similar projection, $i$, on the flange $k$ of the nut. A groove, $l$, is cut near the inner end of each spoke, and the annular projections $h$ and $i$ on the box and nut fit into these grooves and hold the spokes as if they were riveted. The inner ends of the spokes rest on the outer surface of the box. This arrangement permits the spoke to act both by tension and by resistance to a crushing force at different times, as its position in the wheel varies while revolving. The spoke is also held firmly in the metal somewhat as a wooden spoke is held in the mortise of a wooden hub. The box on its outer surface may be slightly enlarged near the flange to cause the box to press snugly against the end of the spokes when the nut is screwed on tight, and there may also be a wedge-shaped annulus on the inner edge of the nut to pass in like manner for the same purpose under the end of the spokes. One half the spokes would rest on one of them and the other half on the other one. The spokes may be either straight or tapered, and either round or oval. The spokes may also be screwed into the hub, if desired. The rim may be a pipe with a half-oval cross-section, or its cross-section may be in the form of a truncated cone or quadrilateral. Spoke-holes are drilled through the rim and threads cut in them. The spokes are screwed into these holes and riveted. As the rim is metallic, a tire may be dispensed with.

What I claim as my invention, and desire to secure by Letters Patent, is—

The combination, in a hub, of the spoke-holder $a$, with flanges and recesses, as described, and the box $b$, with flange and annular projection, and the nut $c$, with similar flange and projection.

JOSEPH FRENIER.

Witnesses:
  WM. NILES,
  E. H. SCOTT.